(12) United States Patent
Woo

(10) Patent No.: US 10,565,875 B2
(45) Date of Patent: Feb. 18, 2020

(54) APPARATUS AND METHOD FOR PARKING ASSIST

(71) Applicant: MANDO CORPORATION, Pyeongtaek-si, Gyeonggi-do (KR)

(72) Inventor: Hyeong Min Woo, Seongnam-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 16/172,022

(22) Filed: Oct. 26, 2018

(65) Prior Publication Data

US 2019/0130748 A1  May 2, 2019

(30) Foreign Application Priority Data

Oct. 27, 2017 (KR) .................. 10-2017-0141337

(51) Int. Cl.
*G08G 1/14* (2006.01)
(52) U.S. Cl.
CPC .................... *G08G 1/141* (2013.01)
(58) Field of Classification Search
CPC .......................................... G08G 1/141
USPC ............. 340/932.2, 425.5, 539.13
See application file for complete search history.

(56) References Cited

U.S. PATENT DOCUMENTS

| 5,265,893 A * | 11/1993 | Ettlin | B62B 3/18 108/90 |
| 2010/0302068 A1 * | 12/2010 | Bandukwala | G08G 1/14 340/932.2 |
| 2014/0176348 A1 * | 6/2014 | Acker, Jr. | G08G 1/144 340/932.2 |

(Continued)

FOREIGN PATENT DOCUMENTS

| KR | 10-2013-0113092 A | 10/2013 |
| KR | 10-2015-0051782 A | 5/2015 |
| KR | 10-2017-0055334 A | 5/2017 |

OTHER PUBLICATIONS

Office Action issued in Korean Patent Application No. 10-2017-0141337 dated Feb. 12, 2019, with English translation.

(Continued)

*Primary Examiner* — Daryl C Pope
(74) *Attorney, Agent, or Firm* — Morgan, Lewis & Bockius LLP

(57) ABSTRACT

The present invention relates to an apparatus and method for parking assist. The parking assist apparatus includes: a parking space search unit configured to search for a plurality of parking spaces, in which parking is possible, and objects adjacent to the plurality of parking spaces while a vehicle travels and is being braked; a parking space storage unit configured to generate parking space information including a width and length of the parking space and a parking direction and object information including a type and size of the object and configured to store parking space identification information including the parking space information and the object information; a parking space output unit configured to output the parking space identification information on each of the plurality of parking spaces and configured to display and output a parking-planned space to a driver; and a parking space selection unit configured to receive a selection signal from the driver of the vehicle and select the parking-planned space.

11 Claims, 6 Drawing Sheets

(56) References Cited

U.S. PATENT DOCUMENTS

| | | | |
|---|---|---|---|
| 2014/0222601 A1* | 8/2014 | Soldate | G06Q 10/087 705/22 |
| 2015/0054661 A1* | 2/2015 | Noh | G08G 1/141 340/932.2 |
| 2018/0260868 A1* | 9/2018 | Peterson | G06Q 30/0619 |

OTHER PUBLICATIONS

Office Action issued in Korean Patent Application No. 10-2017-0141337 dated Jun. 21, 2019, with English translation.

* cited by examiner

APPARATUS AND METHOD FOR PARKING ASSIST

CROSS-REFERENCE TO RELATED APPLICATION

Pursuant to 35 U.S.C. § 119 (a), this application claims the benefit of earlier filing date and right of priority to Korean Patent Application No. 10-2017-0141337, filed on Oct. 27, 2017, the contents of which are hereby incorporated by reference in its entirety.

BACKGROUND

1. Field of the Invention

The present invention relates to an apparatus and method for parking assist, and more particularly, to an apparatus and method for parking assist capable of selecting a parking space.

2. Discussion of Related Art

In recent years, as autonomous driving vehicles have gained attention, there has been an increase in the number of vehicles equipped with an automatic parking assist system that controls a position trajectory of a vehicle and assists parking of the vehicle in a parking space or exiting of the vehicle from the parking space. Such an automatic parking assist system may be referred to as a smart parking assisting system (SPAS), an intelligent parking assist system (IPAS), an advanced parking guidance system (APGS), or the like.

Such an automatic parking assist system is a system which measures a length of a parking space by using an ultrasonic sensor or a camera disposed in front of, behind, or beside a vehicle and recognizes an available parking space, thereby performing an automatic steering operation related to parking of the vehicle in a parking space or exiting of the vehicle from the parking space.

In this case, a conventional automatic parking assist system includes a parking space searching process for searching for a parking space in which a vehicle will be parked, a parking path calculation process for calculating, on the basis of the found parking space, a parking path along which the vehicle will move to be parked at a target parking position, and a parking process in which the vehicle moves along the calculated parking path to be parked.

However, the conventional automatic parking assist system fails to sufficiently inform a driver of a situation or state of parking control, and in particular, there is a problem in that parking guidance is not properly performed when a plurality of spaces are found in the parking space searching process.

That is, since, when a plurality of parking spaces have been found, the conventional automatic parking assist system only sets a parking space which has been found lastly as a target parking position and attempts parking, an optimal parking space may be missed, and thus an inconvenience may be caused in automatic parking.

In addition, when a driver searches for a parking space for a vehicle at a relatively high traveling speed, there may be a problem in that, even if a parking space is found, the parking space may be missed due to braking time required for the vehicle traveling at a high traveling speed. That is, even if the driver has found an optimal parking space, the automatic parking assist system searches for another parking space during the braking time and selects a parking space that has been found lastly, instead of the parking space desired by the driver, as a target parking position. Thus, there is a problem in that the utility is rather decreased.

Further, there is a problem in that, due to lack of information on the plurality of parking spaces, the driver may feel a sense of unfamiliarity with automatic parking.

SUMMARY OF THE INVENTION

The present invention has been devised to solve the above problems and is directed to providing an apparatus and method for parking assist capable of selecting a parking space.

That is, the present invention is directed to providing an apparatus and method for parking assist in which a driver is allowed to select a parking space so that parking is controlled to take place in an optimal parking space.

The present invention is also directed to providing an apparatus and method for parking assist in which information on a parking space is provided to the driver.

Objects to be achieved by the present invention are not limited to the above-mentioned objects, and other unmentioned objects should be clearly understood by those of ordinary skill in the art from the following descriptions.

To achieve the above objects, a parking assist apparatus according to an embodiment of the present invention includes: a parking space search unit configured to search for a plurality of parking spaces, in which parking is possible, and objects adjacent to the plurality of parking spaces while a vehicle travels and is being braked; a parking space storage unit configured to generate parking space information including a width and length of the parking space and a parking direction and object information including a type and size of the object and configured to store parking space identification information including the parking space information and the object information; a parking space output unit configured to output the parking space identification information on each of the plurality of parking spaces and configured to display and output a parking-planned space to a driver; and a parking space selection unit configured to receive a selection signal from the driver of the vehicle and select the parking-planned space.

To achieve the above objects, a parking assist method according to an embodiment of the present invention includes a parking space search operation in which a plurality of parking spaces, in which parking is possible, and objects adjacent to the plurality of parking spaces are searched for while a vehicle travels and is being braked; a parking space storage operation in which parking space information including a width and length of the parking space and a parking direction and object information including a type and size of the object are generated and parking space identification information including the parking space information and the object information is stored; a parking space output operation in which the parking space identification information on each of the plurality of parking spaces is output and a parking-planned space is displayed and output to a driver; and a parking space selection operation in which a selection signal is received from the driver of the vehicle and the parking-planned space is selected.

Other details of the present invention are included in the detailed description and the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
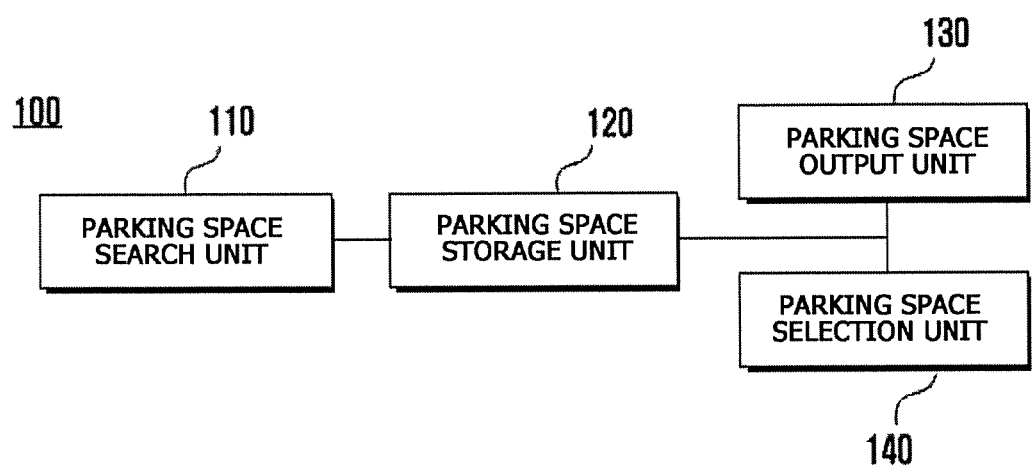
FIG. 1 is a block diagram of a parking assist apparatus according to an embodiment of the present invention.

Hereinafter, exemplary embodiments of the present invention will be described in detail with reference to the accompanying drawings. Advantages and features of the present invention and a method of achieving the same should become clear with embodiments described in detail below with reference to the accompanying drawings. However, the present invention is not limited to embodiments disclosed below and is realized in various other forms. The present embodiments make the disclosure of the present invention complete and are provided to completely inform one of ordinary skill in the art to which the present invention pertains of the scope of the invention. The present invention is defined only by the scope of the claims.

Like reference numerals refer to like elements throughout.

Terms including ordinals such as first and second may be used to describe various devices, elements, and/or sections, but the devices, elements, and/or sections are not limited by the terms. The terms are only used for the purpose of distinguishing one device, element, or section from another device, element, or section. Accordingly, a first device, first element, or first section mentioned below may, of course, be a second device, second element, or second section in the technical idea of the present invention.

Terms used herein are for describing the embodiments and are not intended to limit the present invention. In the specification, a singular expression includes a plural expression unless the context clearly indicates otherwise. "Comprises" and/or "made of" used herein do not preclude the existence or the possibility of adding one or more elements, steps, operations and/or devices other than those mentioned.

Hereinafter, the present invention will be described in more detail with reference to the accompanying drawings.

A parking assist system herein refers to a control unit for controlling a parking assist function for assisting in parking of a vehicle. For example, a controller of the parking assist system may refer to a main control unit (MCU) or a central processing unit (CPU) of a vehicle or refer to some functions of the MCU or CPU. In addition, the parking assist function controlled by the parking assist system refers to a parking assist system (PAS), a smart PAS (SPAS), or the like and includes at least one of a parking space searching function, a parking availability determining function, and steering control and vehicle speed control functions for allowing a vehicle to enter a parking space. In addition, parameters for determining whether to start a parking assist operation may refer to information generated from various types of sensors inside and/or outside a vehicle such as an ultrasonic sensor, a steering angle sensor, and a camera sensor. Alternatively, the parameters may include information received from a vehicle-to-everything (V2X) communication device in a navigation or a vehicle or received from an apparatus outside a vehicle such as a global positioning system (GPS) module.

That is, the parameters may be interpreted as encompassing all of information generated by the vehicle itself and information transmitted after being generated outside the vehicle.

FIG. 1 is a block diagram of a parking assist apparatus 100 according to an embodiment of the present invention.

Referring to FIG. 1, the parking assist apparatus 100 according to the present invention may include a parking space search unit 110 configured to search for a plurality of parking spaces, in which parking is possible, and objects adjacent to the plurality of parking spaces while a vehicle travels and is being braked, a parking space storage unit 120 configured to generate parking space information including a width and length of the parking space and a parking direction and object information including a type and size of the object and configured to store parking space identification information including the parking space information and the object information, a parking space output unit 130 configured to output the parking space identification information on each of the plurality of parking spaces and configured to display and output a parking-planned space to a driver; and a parking space selection unit 140 configured to receive a selection signal from the driver of the vehicle and select the parking-planned space.

In this case, the parking assist apparatus 100 may be included in the parking assist system or may be separated from the parking assist system and transmit and receive various pieces of information and control signals through in-vehicle communication.

Specifically, the parking space search unit 110 may receive parking environment information including the parking spaces and the objects from the parking assist system and a detecting apparatus of the vehicle included in various types of traveling assist systems included in the vehicle such as the lane departure warning system and lane keeping assist system (LDWS & LKAS) and smart cruise control (SCC).

That is, the parking space search unit 110 may detect objects disposed around the vehicle and an empty space generated by the objects and may search for parking spaces.

For example, the parking space search unit 110 may search for objects such as a parked vehicle, a column, and a wall disposed in front, rear, left, and right directions of the vehicle equipped with the parking assist system and may extract an empty space between or in the vicinity of the objects and search for parking spaces. That is, while the vehicle equipped with the parking assist system travels or is being braked for parking, the parking space search unit 110 may receive the parking environment information from the detecting apparatus and detect the objects and the parking spaces.

In this case, the apparatus configured to detect the parking environment of the vehicle performs a function of detecting surrounding environment related to areas behind, beside, and in front of the vehicle. The apparatus may include a camera and a radar sensor module and further include at least one or more of an ultrasonic sensor module and an infrared sensor module, but embodiments are not limited thereto. The apparatus may be any apparatus among apparatuses capable of detecting even a blind spot that is capable of detecting the surrounding environment.

Further, in the detecting of the surrounding environment of the vehicle, since accurate determination is not possible by only using information from an ultrasonic sensor, the parking environment may be more accurately searched for by also using a radar and a camera disposed in front of, behind, and beside the vehicle.

For example, the parking space search unit 110 may extract parking lines through an image captured by the camera and combine pieces of geometrical information of the extracted parking lines (for example, thicknesses and lengths of the parking lines and intervals therebetween), thereby more accurately searching for the parking spaces.

In addition, the parking environment information detected by the various types of traveling assist systems and various types of sensors included in the vehicle may be transmitted to the parking space search unit 110 through in-vehicle communication. In this case, the in-vehicle communication may be configured with a wireless communication network including the Internet, an integrated services digital network (ISDN), an asymmetric digital subscriber line (ASDL), a local area network (LAN), the Ethernet, a controller area network (CAN), a TCP/IP-based communication network, an optical communication network, and a mobile communication network such as code division multiple access (CDMA) and wideband CDMA (WCDMA) and a short-range communication network such as ZigBee and Bluetooth.

In this case, the parking space storage unit 120 may receive the parking environment information from the parking space search unit 110 in real time, generate the parking space information and the object information on the basis of the parking environment information, and store the same.

In this case, the parking space storage unit 120 may prioritize the parking spaces on the basis of the parking space information and the object information and may generate the parking space identification information that allows the plurality of parking spaces to be effectively identified.

In addition, the parking space identification information of the parking space storage unit 120 may further include at least one or more of a unique number, symbol, image, color, and level of priority for identifying the parking space. For example, by matching one or more colors (red, yellow, green, etc.) or numbers (1, 2, 3, . . . ) to each of the plurality of parking spaces, the parking space storage unit 120 may allow the driver to easily distinguish a parking space.

The levels of priority calculated in the parking space storage unit 120 may be classified into high, medium, low, and the lowest. Table 1 below shows an example corresponding to the levels of priority.

vehicle, and the parking direction is parallel parking, the level of priority may be determined as "High."

Here, when the level of priority belongs to the "Medium" category, in contrast to the parking environment information of the parking space whose level of priority is "High," a parking environment related to the level "Medium" may be determined as a parking space in which it is inconvenient for the driver to park the vehicle. That is, when the width of the space is 0.8 m or more and the parking direction is parallel parking, but the length of the space is less than 2.5 m and the detected object is an obstacle, which is a wall or column, the level of priority may be determined as "Medium."

On the other hand, when the level of priority belongs to the "Low" or the "Lowest" category, in contrast to the parking environment information of the parking space whose level of priority is "High" or "Medium," a parking space related to the level "Low" or "Lowest" may be determined as a minimum parking space for the driver to park the vehicle. That is, when the width of the space is less than 0.8 m, the length of the space is less than 2.5 m, the parking direction is perpendicular parking, and the detected object is an obstacle, which is a wall or column, or a large parked vehicle, the level of priority may be determined as Low" or "Lowest."

However, the conditions for the levels of priority shown in Table 1 are merely examples, and the parking space storage unit 120 is not limited to having such conditions for the parking space information and object information.

Therefore, a weighted value related to the conditions may be assigned according to the form of parking on the basis of the parking environment information including the parking space information and object information, and the level of priority may be set as described above by calculating the weighted value. In this case, the parking space storage unit 120 is a storage medium configured to store at least one or more pieces of information or data. The parking space storage unit 120 may include, in terms of hardware, at least one or more storage means including an electrically erasable and programmable read-only memory (EEPROM), a flash memory (FM), and a hard disk drive (HDD), at least one or more processors including a CPU/micro-processing unit (MPU), an executing memory (e.g., a register), a bus configured for an input or output of predetermined data, and at least one or more electronic circuits (or integrated circuits) for the bus. The parking space storage unit 120 may include, in terms of software, a program routine or program data that

TABLE 1

| Information on parking spaces and | Level of priority | | | |
|---|---|---|---|---|
| objects | High | Medium | Low | Lowest |
| Width of space | 0.8 m or more | 0.8 m or more | Less than 0.8 m | Less than 0.8 m |
| Length of space | 2.5 m or more | 2.5 m or more | Less than 2.5 m | Less than 2.5 m |
| Surrounding object | Parked vehicle (small) | Wall/column | Parked vehicle (large) | Wall/column |
| Parking direction | Parallel parking | Parallel parking | Perpendicular parking | Perpendicular parking |

As shown in Table 1, when the level of priority belongs to the "High" category, a parking space which has parking environment information related to the level "High" may be determined as an optimal parking space. That is, when the width of the space is 0.8 m or more, the length of the space is 2.5 m or more, the detected object is a small parked is loaded from the storage means to the executing memory for performing a unique function and then is operated by the processor.

That is, the parking space output unit 130 may display parking space identification information allocated corresponding to each parking space received from the parking space storage unit 120 and may output a parking-planned space which is determined on the basis of the level of priority. In this case, the parking space output unit 130 may include at least one or more of an image output device and a HMI.

For example, the parking space output unit 130 may display found parking spaces and parking space identification information allocated corresponding to each parking space and may also display various pieces of information related to control of the vehicle, such as a gear shift, as well as images of objects.

In this case, the image output device of the parking space output unit 130 may be a head-up display device configured to display a warning image or text on a front glass window of the vehicle or may be a display device having a function of a navigation or the like.

The parking space selection unit 140 may receive the plurality of parking spaces and the parking space identification information from the parking space storage unit 120 and output the received parking spaces and parking space identification information to the driver through the parking space output unit 130, thereby allowing the driver to select a parking-planned space and selecting an optimal parking-planned space through a selection signal input by the driver.

For example, the parking space selection unit 140 may be configured with a touchscreen or touch panel and may receive the selection signal from the driver while outputting various pieces of information required for parking of the vehicle to the driver. That is, the parking space selection unit 140 may output the parking space information and object information received from the parking space storage unit 120 and may additionally provide visual information related to the surroundings of the vehicle. Thus, the parking space selection unit 140 may be integrally configured with the parking space output unit 130.

Specifically, the driver may touch and select any one of the plurality of parking-planned spaces output on the parking space selection unit 140 and parking space output unit 130 made of a touchscreen or touch panel, and the selected parking-planned space may be displayed using a symbol, a figure, shading, or the like so that it is distinguished.

In addition, the selection signal may include information detected in a state in which a gear of a transmission included in the vehicle is shifted to R (reverse). For example, when the vehicle travels for parking, a parking-planned space which is closest to the vehicle among the plurality of parking-planned spaces is output on the parking space output unit 130 in real time. In this case, the driver may select the parking-planned space closest to the vehicle by setting the gear of the transmission to R.

Further, by transmitting the selection signal to the parking assist system through in-vehicle communication, the parking space selection unit 140 may easily control operation of the vehicle so that the vehicle may be parked in the parking-planned space.

As described above, the parking assist apparatus 100, which is the present invention, allows the vehicle to select a parking space and provides information on a parking-planned space, thereby improving convenience of the driver.

Figure 2A:
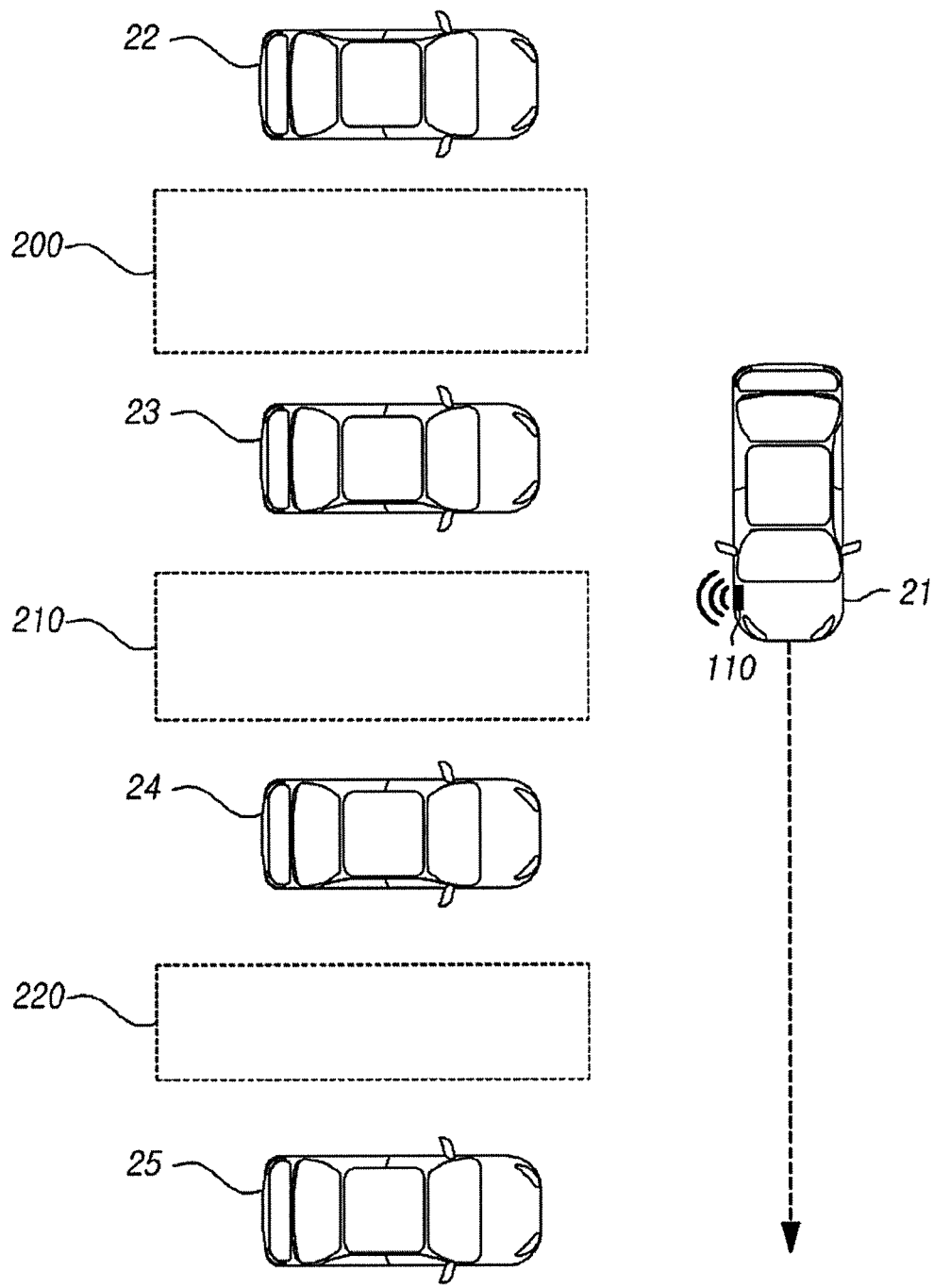
FIGS. 2A and 2B are views illustrating an example of a parking assist method according to an embodiment of the present invention.
Figure 2B:
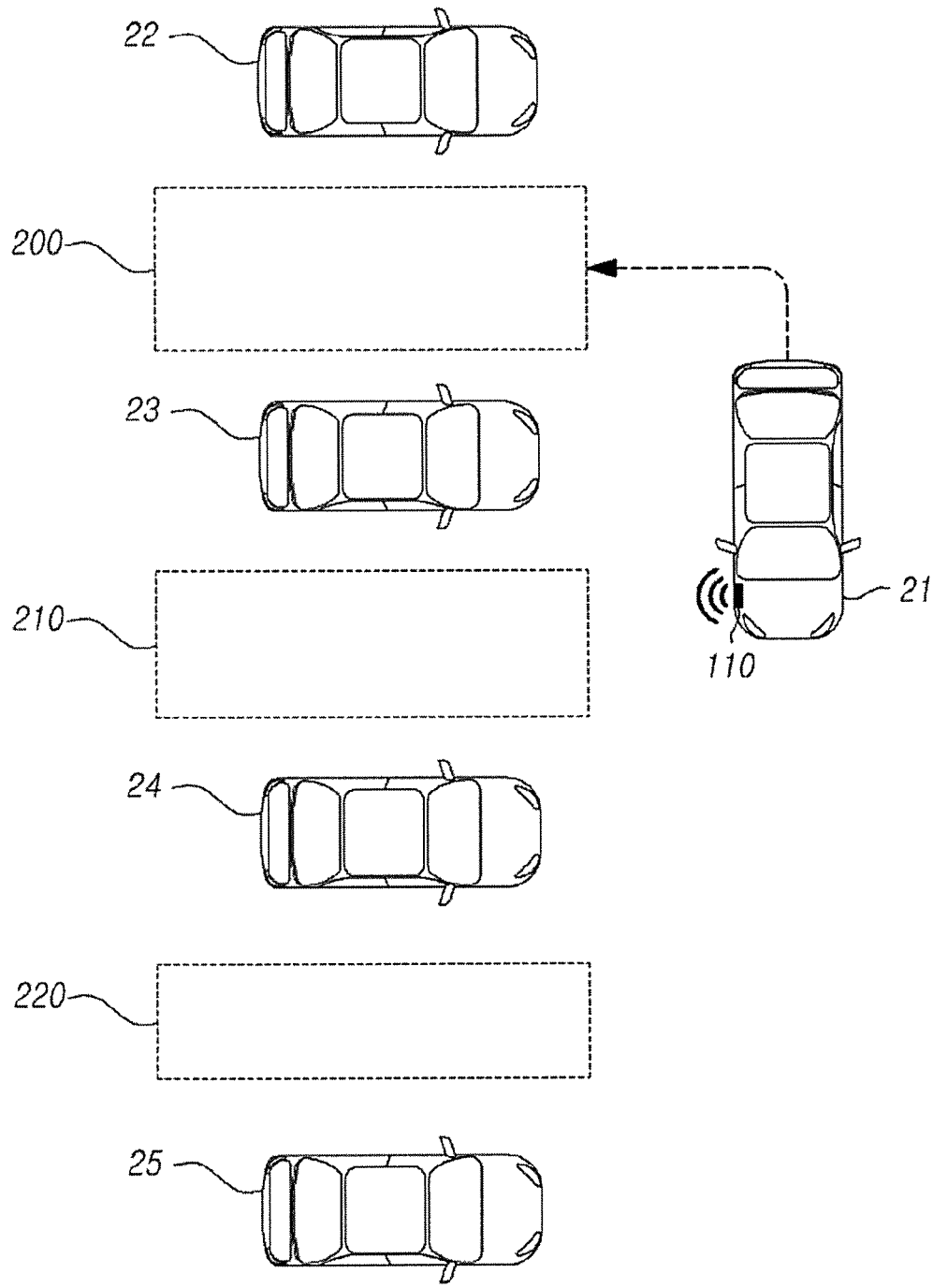

FIGS. 2A and 2B are views illustrating an example of a parking assist method according to an embodiment of the present invention.

Referring to FIG. 2A, a plurality of parked vehicles 22, 23, 24, and 25 are present, and empty spaces, i.e., parking spaces 200, 210, and 220, are present between the plurality of parked vehicles 22, 23, 24, and 25. A vehicle 21 equipped with the parking assist apparatus 100 is searching for an available parking space.

In this case, the vehicle 21, which is searching for a parking space, simultaneously travels in a parking lot and provides the parking spaces 200, 210, and 220 and identification information for the parking spaces 200, 210, and 220 to the driver through the parking assist apparatus 100.

In this case, the identification information for the parking spaces 200, 210, and 220 may include the parking space information and object information and may further include at least one or more of a unique number, symbol, image, color, and level of priority for identifying a parking space.

For example, the parking space identification information may be identified as a first parking space 200, a second parking space 210, and a third parking space 220.

Referring to FIG. 2B, the driver selects the first parking space 200 as an optimal parking-planned space for the vehicle 21 from among the found parking spaces 200, 210, and 220 and parks the vehicle 21 in the first parking space 200.

In this case, in consideration of a parking direction of the vehicle 21, the first parking space 200 which has the greatest width from among the parking spaces 200, 210, and 220 may be selected as the optimal parking-planned space.

Figure 3A:
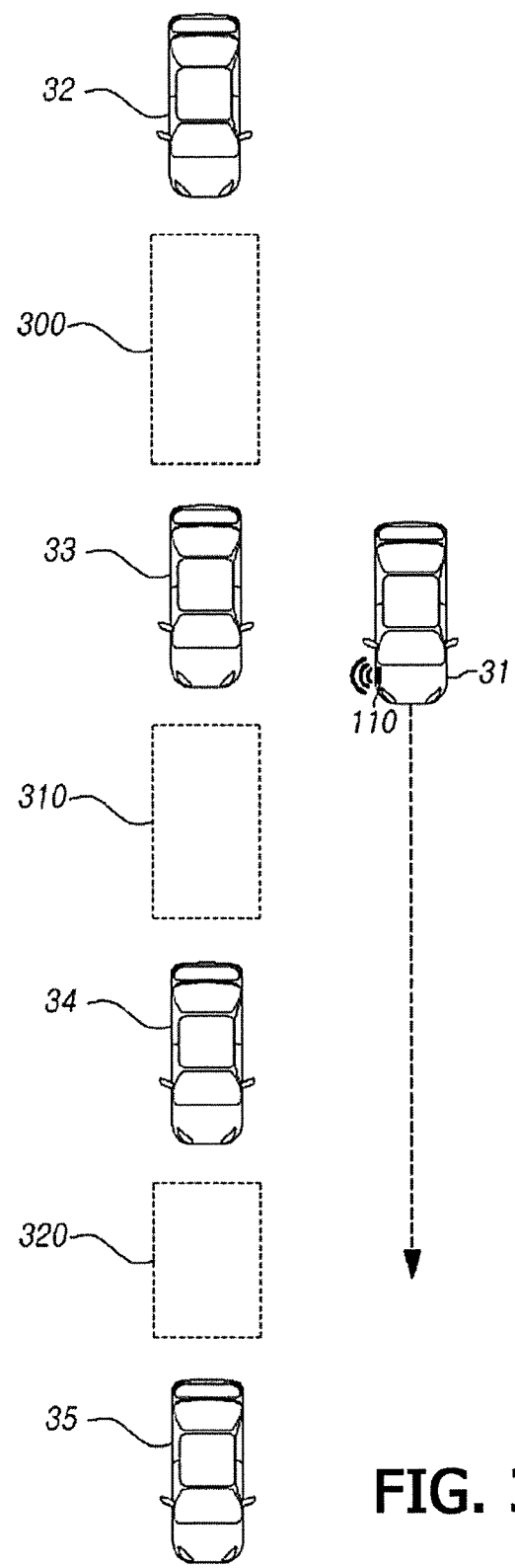
FIGS. 3A and 3B are views illustrating an example of a parking assist method according to an embodiment of the present invention.
Figure 3B:
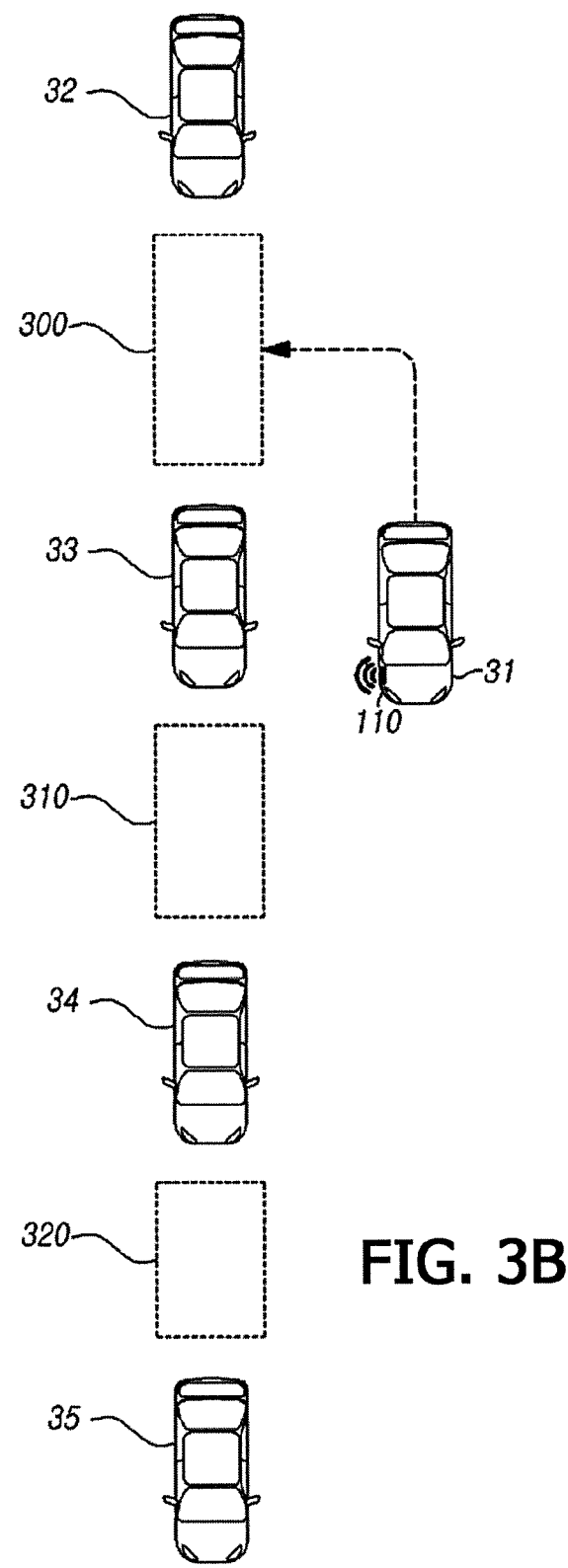

FIGS. 3A and 3B are views illustrating an example of a parking assist method according to an embodiment of the present invention.

Referring to FIG. 3A, a plurality of parked vehicles 32, 33, 34, and 35 are present, and empty spaces, i.e., parking spaces 300, 310, and 320, are present between the plurality of parked vehicles 32, 33, 34, and 35. A vehicle 31 equipped with the parking assist apparatus 100 is searching for an available parking space.

In this case, the vehicle 31, which is searching for a parking space, simultaneously travels in a parking lot and provides the parking spaces 300, 310, and 320 and identification information for the parking spaces 300, 310, and 320 to the driver through the parking assist apparatus 100.

In this case, the identification information for the parking spaces 300, 310, and 320 may include the parking space information and object information and may further include at least one or more of a unique number, symbol, image, color, and level of priority for identifying a parking space.

For example, the parking space identification information may be identified as a first parking space 300, a second parking space 310, and a third parking space 320.

Referring to FIG. 3B, the driver selects the first parking space 300 as an optimal parking-planned space for the vehicle 31 from among the found parking spaces 300, 310, and 320 and parks the vehicle 31 in the first parking space 300.

In this case, in consideration of a parking direction of the vehicle 31, the first parking space 300 which has the greatest length from among the parking spaces 300, 310, and 320 may be selected as the optimal parking-planned space.

Figure 4:
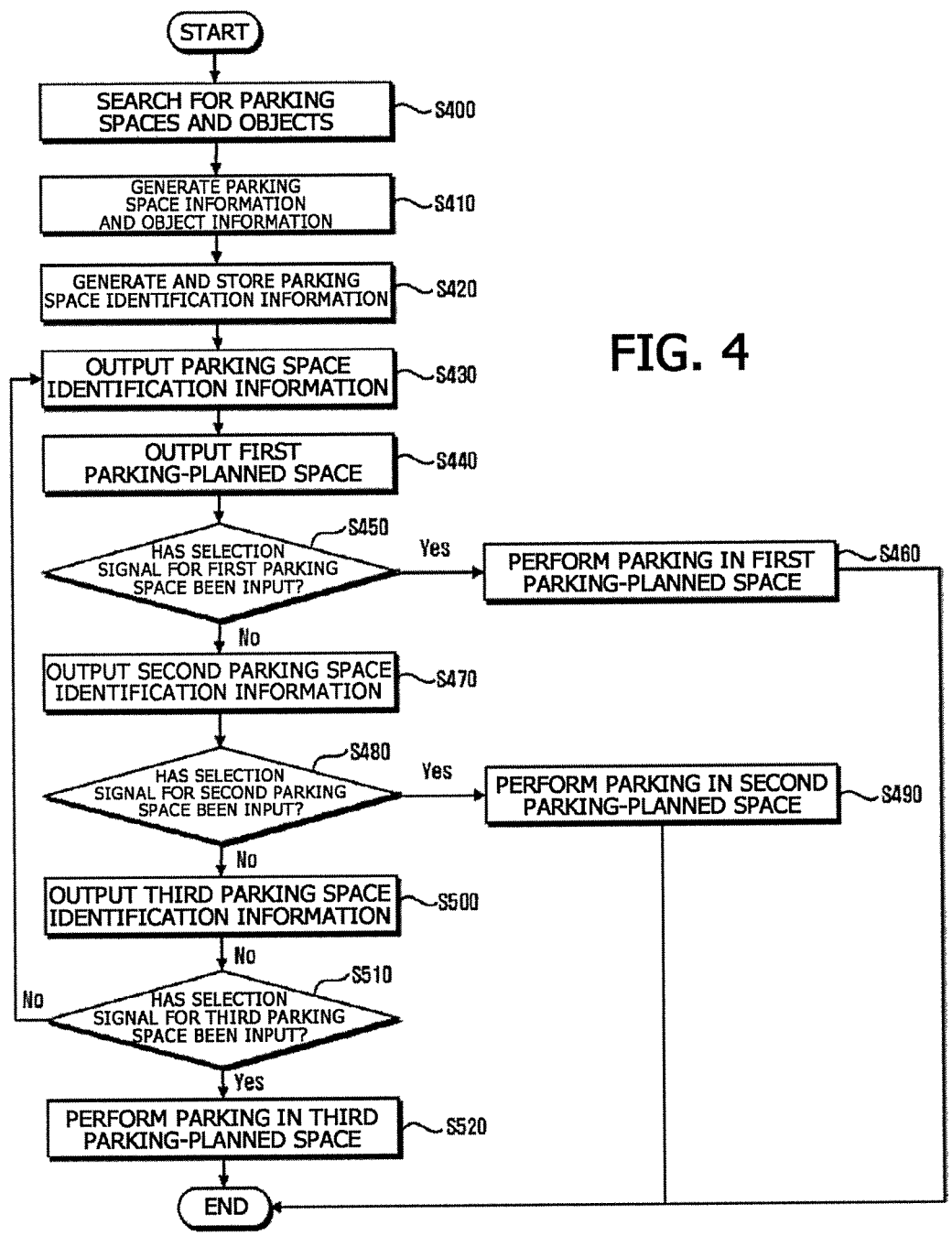
FIG. 4 is a flowchart for describing a parking assist method according to an embodiment of the present invention.

FIG. 4 is a flowchart for describing a parking assist method according to an embodiment of the present invention.

A parking assist method according to the present invention may include a parking space search operation in which a plurality of parking spaces, in which parking is possible, and objects adjacent to the plurality of parking spaces are searched for while a vehicle travels and is being braked, a parking space storage operation in which parking space information including a width and length of the parking space and a parking direction and object information including a type and size of the object are generated and parking space identification information including the parking space information and the object information is stored, a parking space output operation in which the parking space identification information on each of the plurality of parking spaces is output and a parking-planned space is displayed and output to a driver, and a parking space selection operation in which a selection signal is received from the driver of the vehicle and the parking-planned space is selected.

Referring to FIG. 4, in the parking space search operation, a plurality of parking spaces, in which parking is possible, and objects adjacent to the plurality of parking spaces are searched for while a vehicle travels and is being braked (S400). That is, the parking space may be searched for by detecting objects disposed around the vehicle and an empty space generated between the objects.

For example, a parking space may be searched for by searching for objects such as a parked vehicle, a column, and a wall disposed in front, rear, left, and right directions of the vehicle and extracting an empty space between or in the vicinity of the objects.

Then, in the parking space storage operation, parking space information including a width and length of the parking space and a parking direction and object information including the type and size of the object are generated (S410).

Simultaneously, parking space identification information including the parking space information and the object information is generated and stored (S420).

That is, the level of priority of the parking space may be determined on the basis of the parking space information and object information, and the parking space identification information, which allows the plurality of parking spaces to be effectively identified, may be generated. In this case, the parking space identification information may further include at least one or more of a unique number, symbol, image, color, and level of priority for identifying the parking space.

Then, in the parking space output operation, the stored parking space identification information is output to the driver of the vehicle (S430). In this case, a first parking-planned space, which is closest to the vehicle from among the parking spaces and in which convenient parking is possible, is output on the basis of the parking space identification information including the level of priority (S440).

Then, in the parking space selection operation, whether the driver has input a selection signal for selecting the output first parking-planned space is determined (S450).

In this case, the selection signal may include information detected in a state in which a gear of a transmission included in the vehicle is shifted to R (reverse). For example, when the vehicle travels for parking, a parking-planned space which is closest to the vehicle among the plurality of parking-planned spaces is output on the parking space output unit 130 in real time. In this case, the driver may select the parking-planned space closest to the vehicle by setting the gear of the transmission to R.

In this case, if the selection signal for selecting the first parking-planned space has been input, a parking performing signal is transmitted to the parking assist system so that the vehicle is parked in the first parking-planned space. In this way, parking is performed (S460).

On the other hand, if the selection signal for selecting the first parking-planned space has not been input, in the parking space output operation, a second parking-planned space, which is closest to the vehicle and in which convenient parking is possible, is output on the basis of the parking space identification information (S470).

Then, in the parking space selection operation, whether the driver has input a selection signal for selecting the output second parking-planned space is determined (S480).

In this case, if the selection signal for selecting the second parking-planned space has been input, a parking performing signal is transmitted to the parking assist system so that the vehicle is parked in the second parking-planned space. In this way, parking is performed (S490).

On the other hand, if the selection signal for selecting the second parking-planned space has not been input, in the parking space output operation, a third parking-planned space, which is closest to the vehicle and in which convenient parking is possible, is output on the basis of the parking space identification information (S500).

Then, in the parking space selection operation, whether the driver has input a selection signal for selecting the output third parking-planned space is determined (S510).

In this case, if the selection signal for selecting the third parking-planned space has been input, a parking performing signal is transmitted to the parking assist system so that the vehicle is parked in the third parking-planned space. In this way, parking is performed (S520).

On the other hand, if the selection signal for selecting the third parking-planned space has not been input, the parking space identification information is re-output (S430) and the first and second parking-planned spaces, each of which is closest to the vehicle and in which convenient parking is possible, are re-output simultaneously.

As described above, since the apparatus and method for parking assist according to the present invention allow parking to take place in an optimal parking space, the utility of the parking assist system may be improved. In addition, since the apparatus and method for parking assist allow various pieces of information on parking spaces to be provided to the driver, parking convenience may be provided to the driver.

As described above, according to the present invention, since parking is controlled to take place in an optimal parking space, the utility of the parking assist system can be improved.

In addition, since various pieces of information on parking spaces are provided, parking convenience can be provided to a driver.

The technical idea of the present invention has been described above, but the above description is merely illustrative, and one of ordinary skill in the art to which the present invention pertains should be able to modify and change the present invention within the scope not departing from essential features of the present invention. The scope of the present invention should be interpreted from the claims below, and all technical ideas within the scope equivalent thereto should be interpreted as belonging to the scope of the present invention.

What is claimed is:

1. A parking assist apparatus comprising:
a parking space search unit configured to search for a plurality of parking spaces, in which parking is possible, and objects adjacent to the plurality of parking spaces while a vehicle travels and is being braked;
a parking space storage unit configured to generate parking space information including a width and length of the parking space and a parking direction and object information including a type and size of the object and configured to store parking space identification information including the parking space information and the object information;

a parking space output unit configured to output the parking space identification information on each of the plurality of parking spaces and configured to display and output a parking-planned space to a driver; and a parking space selection unit configured to receive a selection signal from the driver of the vehicle and select the parking-planned space.

2. The parking assist apparatus of claim 1, wherein the parking space search unit receives parking environment information, which includes the parking spaces and the objects, from an apparatus configured to detect a surrounding environment of the vehicle.

3. The parking assist apparatus of claim 1, wherein the parking space storage unit determines a level of priority of the parking space on the basis of the parking space information and object information.

4. The parking assist apparatus of claim 3, wherein the parking space identification information further includes at least one or more of a unique number, a symbol, an image, a color, and a level of priority for identifying the parking space.

5. The parking assist apparatus of claim 3, wherein the parking-planned space is determined on the basis of the level of priority.

6. The parking assist apparatus of claim 1, wherein the parking space output unit includes at least one or more of an image output device and a human machine interface (HMI).

7. The parking assist apparatus of claim 1, wherein the selection signal includes information detected in a state in which a gear of a transmission included in the vehicle is shifted to R (reverse).

8. A parking assist method comprising:

a parking space search operation in which a plurality of parking spaces, in which parking is possible, and objects adjacent to the plurality of parking spaces are searched for while a vehicle travels and is being braked;

a parking space storage operation in which parking space information including a width and length of the parking space and a parking direction and object information including a type and size of the object are generated and parking space identification information including the parking space information and the object information is stored;

a parking space output operation in which the parking space identification information on each of the plurality of parking spaces is output and a parking-planned space is displayed and output to a driver; and a parking space selection operation in which a selection signal is received from the driver of the vehicle and the parking-planned space is selected.

9. The parking assist method of claim 8, wherein, in the parking space storage operation, a level of priority of the parking space is determined on the basis of the parking space information and object information.

10. The parking assist method of claim 9, wherein the parking space identification information further includes at least one or more of a unique number, a symbol, an image, a color, and a level of priority for identifying the parking space.

11. The parking assist method of claim 8, wherein the selection signal includes information detected in a state in which a gear of a transmission included in the vehicle is shifted to R (reverse).

* * * * *